June 4, 1946.    J. E. PATTON    2,401,505
ART OF PRODUCING KNITTED FABRICS WITH LOCKED SELVAGES
Filed Aug. 12, 1941    12 Sheets-Sheet 1

WITNESSES:

INVENTOR:
James Everett Patton,
BY
ATTORNEYS.

June 4, 1946.  J. E. PATTON  2,401,505
ART OF PRODUCING KNITTED FABRICS WITH LOCKED SELVAGES
Filed Aug. 12, 1941  12 Sheets-Sheet 3

WITNESSES:

INVENTOR:
James Everett Patton,
BY
ATTORNEYS.

June 4, 1946.  J. E. PATTON  2,401,505
ART OF PRODUCING KNITTED FABRICS WITH LOCKED SELVAGES
Filed Aug. 12, 1941  12 Sheets-Sheet 4

INVENTOR:
James Everett Patton,
BY
ATTORNEYS.

June 4, 1946.  J. E. PATTON  2,401,505
ART OF PRODUCING KNITTED FABRICS WITH LOCKED SELVAGES
Filed Aug. 12, 1941  12 Sheets-Sheet 5

INVENTOR:
James Everett Patton,
BY Paul & Paul
ATTORNEYS.

June 4, 1946.  J. E. PATTON  2,401,505
ART OF PRODUCING KNITTED FABRICS WITH LOCKED SELVAGES
Filed Aug. 12, 1941  12 Sheets-Sheet 8

WITNESSES:
Thomas W. Kerr Jr.
Woodrow Stevenson

INVENTOR:
James Everett Patton,
BY Paul Paul
ATTORNEYS.

June 4, 1946. J. E. PATTON 2,401,505
ART OF PRODUCING KNITTED FABRICS WITH LOCKED SELVAGES
Filed Aug. 12, 1941 12 Sheets-Sheet 10

WITNESSES:

INVENTOR:
James Everett Patton,
BY
ATTORNEYS.

Patented June 4, 1946

2,401,505

UNITED STATES PATENT OFFICE 2,401,505

ART OF PRODUCING KNITTED FABRICS WITH LOCKED SELVAGES

James Everett Patton, Shelbyville, Tenn., assignor to Davenport-Woosley Processing Corporation, Chattanooga, Tenn., a corporation of Tennessee Application August 12, 1941, Serial No. 406,458

9 Claims. (Cl. 66—89)

This invention is concerned with the production of knited fabrics having locked selvages not only in parallel edge portions thereof, but also in portions which are widened by the addition of extra end loops in predetermined courses as the knitting proceeds for the purpose of varying the profile of the fabrics. Such widening operations are resorted to, for example, in the formation of laterally projecting heel tabs or cheeks at opposite edges of continuously knit blanks fashioned for "round heel" stockings of the type which is being favored at the present time in preference to the usual square heel type of fashioned stockings whereof the blanks are made in two separate operations on differently constructed "Cotton" knitting machines ordinarily known as "leggers" and "footers."

The chief aim of my invention is to make it possible to accomplish widening simply by progressively increasing the traverse of the yarn carriers of the knitting machine without necessitating the use of the transfer points (as in narrowing operations), and at the same time insure the production of locked selvage loops at the ends of the widened courses.

This objective I attain in practice, as hereinafter more fully disclosed, through a simple modification in the construction of the delivery tubes of the yarn carriers used in reinforcing the heel cheeks, whereby the reinforcing yarns are released from said tubes at a higher level than the main yarn or yarns, and whereby I am enabled to feed said reinforcing yarns to needles immediately inwardly adjacent the end needles supplied with the main yarn or yarns and to incidently effect a novel interlock between the loops at the selvages formed from the two yarns.

Another aim of my invention is to secure an improved form of interlocking of the selvage loops along unwidened or uniform width knitted fabrics, which objective is likewise attained in practice as will also appear from subsequent detailed disclosure herein, as a consequence of the above referred to modified construction of the reinforcing yarn carriers of the knitting machine.

My invention thus not only involves the method and the means by which the improved locked selvages are obtained, but also the selvages themselves, and is moreover applicable in the production of fabrics wherein a single body yarn is employed as well as to fabrics which are produced as ringless textures from multiple yarns of the same kind and count used in alternation and in repeating sequence.

Other objects and attendant advantages will appear from the following detailed description of the attached drawings, wherein:

Figs. 4–45 are fragmentary detail views showing more or less diagrammatically, successive steps in the formation of the widened selvage featured in Fig. 2; Figs. 4, 30, 32, 34 38 being front elevations of a portion of the producing knitting machine; Figs. 5, 40, 42 and 44 being perspective views; Figs. 6–29, 31, 33, 35–37, 41, 43 and 45 being plan views; and Fig. 39 being a cross-sectional view taken as indicated by the angled arrows XXXIX—XXXIX in Fig. 38;

Figure 1:
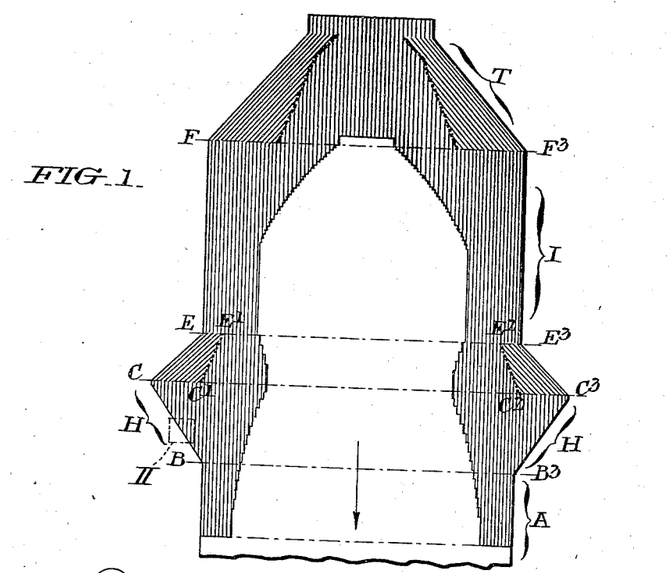
Fig. 1 is a fragmentary view showing a portion of a full fashioned stocking blank with widened selvages at the upper portions of the heel cheeks formed in accordance with my invention.

The stocking blank partially shown in Fig. 1 may be produced in the usual way as far as the uniform width ankle portion A, the direction of the knitting being as indicated by the arrow. Upon reaching the course B—B3, the fabric is progressively widened for a time along each edge to a course C—C'—C2—C3 with attendant formation of the upper portions of projecting heel cheeks H at opposite edges of the blank with inclined selvages B—C and B3—C3. It is with the construction of such selvages that the present invention is more especially concerned. The web is then progressively narrowed as far as a line E—E'—E2—E3 to complete the heel projections H with incidental formation of lines of fashioning marks C'—E'—C2—E2 at complemental angles to the selvage segments C—E—C3—E3 whereupon the foot of the stocking is knitted in a suitable manner with a uniform width instep portion I to the line F—F3 and a tapered toe portion T therebeyond. If desired, a few courses of uniform width fabric may be knit before transition from the widening to the narrowing at the apexes of the heel projections H to approximate a more rounded configuration in the latter. By use of two additional yarns in conjunction with a main yarn, I preferably reinforce the heel projections H as well as the side margins or sole areas of the foot as indicated by the wale line shading in Fig. 1. In various figures of the drawings, the main or body yarn is designated by the letter Y, while the yarn used to reinforce one of the heel cheeks is designated by the character y. In Figs 2-46 certain wales of the web are designated by the numerals 1—7 and successive courses in the region of one of the heel cheeks by the numerals 21—33.

For the purpose of illustrating how my improved method may be carried out in practice, I have herein more or less diagrammatically shown portions of a flat knitting machine of the "Cotton" type which except as presently explained is of ordinary construction having serially arranged sinkers S and dividers D in alternation which are adapted to cooperate with correspondingly arranged spring beard needles N in the formation of fabric loops, some of which needles are designated by the letter N and others (for the purposes of specific reference) by the characters N'—N10, the beards of said needles being closed during their descent in the loop forming cycles by contact with a presser ledge L in the well known way, with knock overs K (Fig. 30) beneath individual sinkers and dividers, and with shiftable stops (not shown) for variantly limiting the horizontal traverse of main and reinforcing yarn carriers respectively designated at 35 and 36, likewise in a well known way. As ordinarily, the delivery tube of the reinforcing yarn carrier 36 reaches down to a level below the tops of the sinkers like the delivery tube of the main yarn carrier 35, but, in accordance with my invention, said reinforcing yarn carrier is cut away at its inner side as at 37 to a level slightly above the tops of the sinkers S. As a consequence of this construction, it is possible to arrest the reinforcing yarn carrier 36 over a sinker S (instead of over a divider as ordinarily) immediately adjacent a divider D over which the main yarn carrier 35 is arrested with the result that the main and reinforcing yarns Y and y may be fed to two immediately adjacent needles. The described construction of the carrier 36 moreover determines delivery of the reinforcing yarn y from a point moving on a level above the sinkers S when said carrier moves outward toward the selvage, but at the same level with the delivery of the main yarn by the carrier 35 when the reinforcing yarn carrier moves inward. The advantage of such manipulation of the reinforcing yarn will also be made clear presently.

Figure 4:
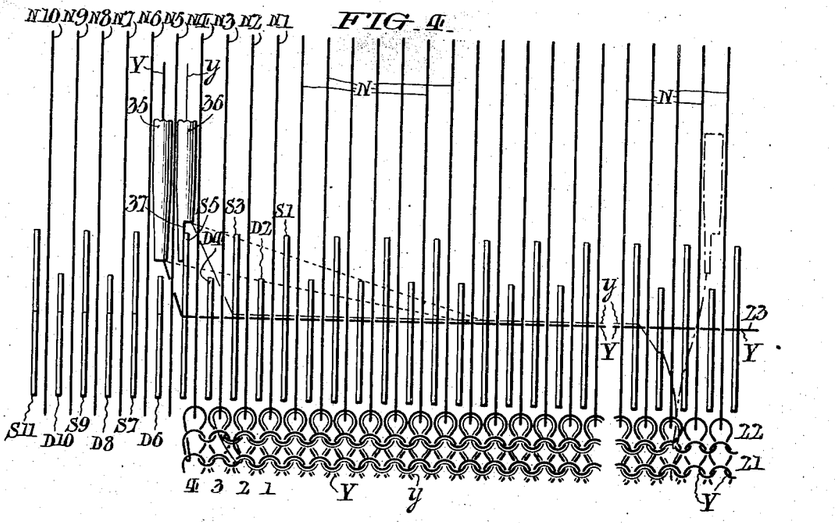
Figure 5:
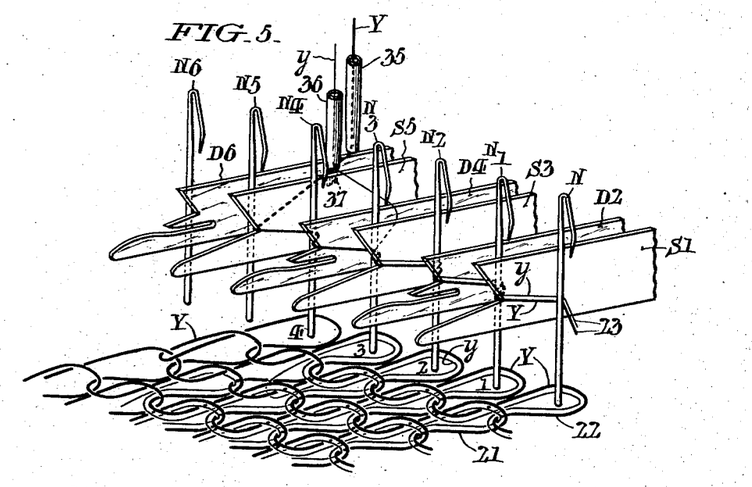
Figure 6:
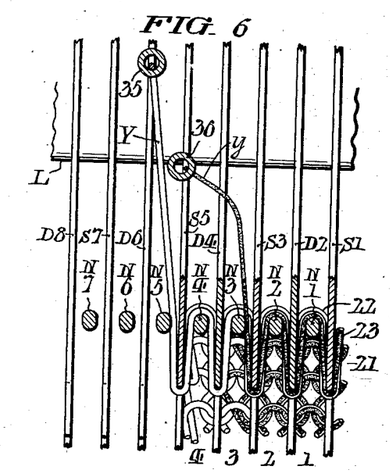
Figure 7:
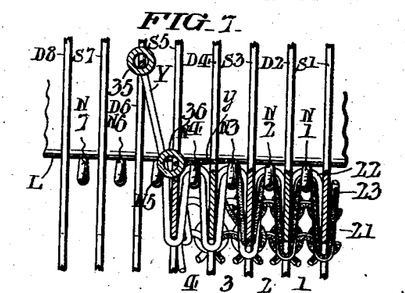
Figure 8:
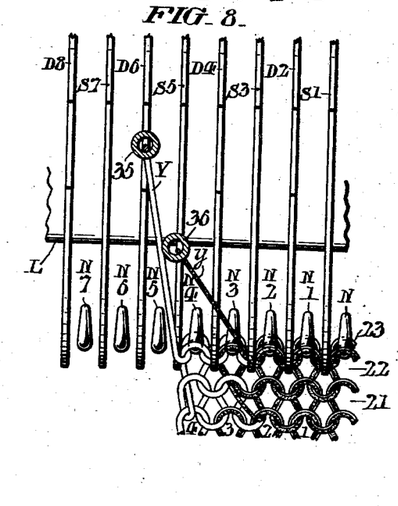
Figure 9:
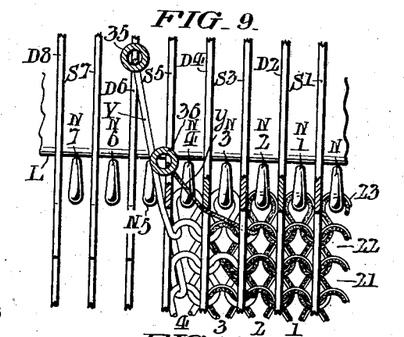
Figure 10:
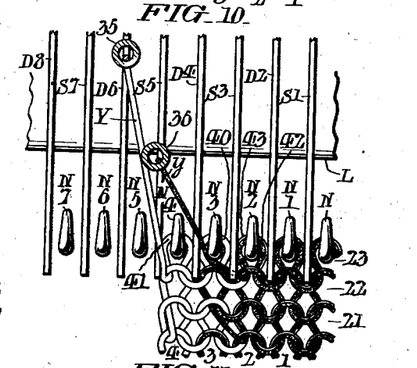

With a knitting machine thus arranged, the method of widened selvage production in accordance with my invention is as follows:

In Figs. 4-6, the carriers 35, 36 have just completed their traverse to the left at the end of a Couliering stroke and have laid their yarns Y and y for the course 23 (Fig. 2) in the ankle portion A of the stocking blank, the main yarn carrier 35 being at rest over the divider D6 and the reinforcing yarn carrier 36 being at rest over the inwardly adjacent sinker S5. In Figs. 4-6, moreover, the sinkers and dividers have all been advanced to measure and sink the main and reinforcing yarns. As the slur cock (not shown) of the machine passed the carriers 35 and 36 after the arresting of the latter during the transpired outward Couliering stroke just referred to, the angles of the yarns Y, y changed from the dotted line showing to the full line showing in Fig. 4 so that as the sinkers were advanced concurrently, the main yarn Y was caught by the sinker S5, while the reinforcing yarn y was caught by the sinker S3, but missed by the intermediate divider D4 due to being delivered from a point which travelled at a level above the sinkers. Thus as the sinkers and dividers were projected, the main yarn Y was definitely sunk around the shank of needle N4 by the sinker S5 and divider D4, and the reinforcing yarn y about the shank of needle N2 by divider D2 and sinker S3, the divider D4 having passed under said yarn as clearly illustrated in Figs. 5 and 6. In Fig. 7, the needles are descending to draw the loops of the newly laid threads and have approached the ledge L for closure of their beards and downward passage through the loops of the previously formed course 22. Fig. 8 shows the sinkers and dividers fully retracted with the needles still going down, and with the loops of the new course 23 just released from the ends of the sinkers for support on the knock overs below said sinkers. In Fig. 9, the sinkers and dividers are projected over the course 23 and the needles are rising close to the ledge L, with the reinforcing yarn y so positioned that the needle N3 may come up behind it. In Fig. 10, the needles are receding from the ledge L and still rising with the needle N3 still rearward of the reinforcing yarn y and the current loop forming cycle just about completed. Thus in course 23, loops 41 and 40 of the main yarn Y alone were formed on the end and penultimate needles N4 and N3, while the last loop 42 of the reinforcing yarn y was formed on and doubled with a loop 43 upon the needle N2 which is inward by two needles or wales from the end needle N4 and corresponding wale 4 as shown in Fig. 10 and also in Fig. 2.

Figure 11:
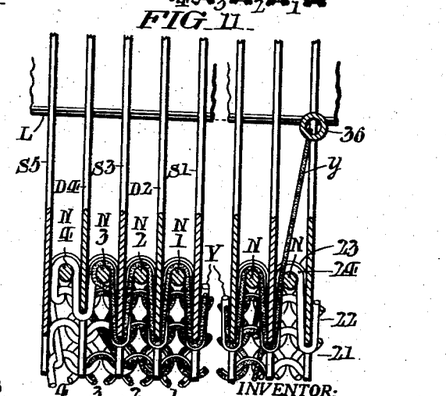
Figure 12:
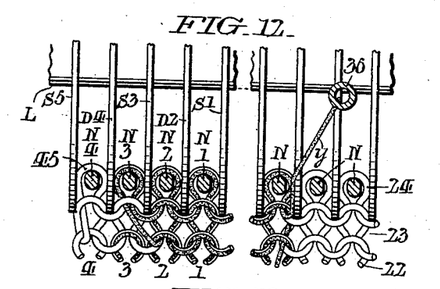

In Fig. 11, the carriers 35 and 36 have completed a succeeding traverse to the right and have laid the yarns Y and y for the next course 24 in the uniform-width ankle portion of the blank, the sinkers and dividers having been again projected to measure and sink the newly laid yarns. By virtue of having been positioned forwardly of the needle N3 as in Fig. 10, the yarn y in its reversed travel was passed about the shank of said needle. In connection with Fig. 11 it is to be understood that the carrier 36 is stopped at a definite point corresponding to the inner limit line of the left high heel reinforced area in Fig. 1, while the feeding of the main yarn Y has been continued to the opposite edge of the blank. Fig. 12 shows the completion of course 24 with the needles up and the sinkers and dividers projected over the loops of said course. From Figs. 2 and 12, it will be observed that during the formation of the course 24 in the manner just explained, a selvage loop 45 is formed from the main yarn Y alone on the end needle N4, while a selvage loop 46 of the reinforcing yarn y is doubled with a plain loop 47 of said main yarn on the present penultimate needle N3. The described selvage characteristics of the courses 23 and 24 are, as will be seen from Fig. 2, similar in all other corresponding courses of the uniform width ankle portion of the stocking.

Figure 13:
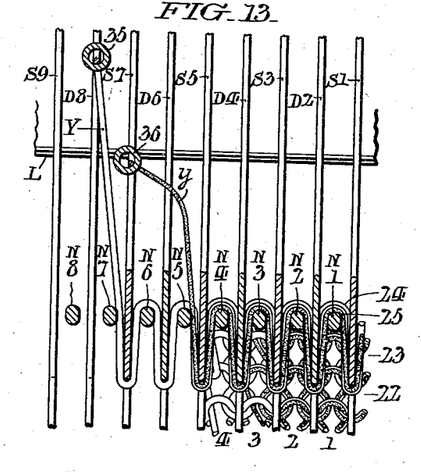
Figure 14:
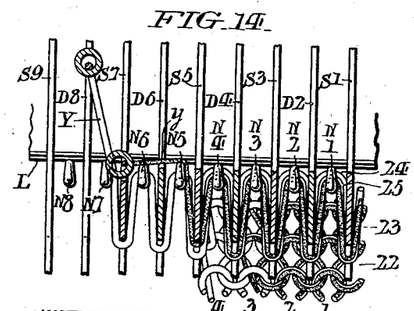
Figure 15:
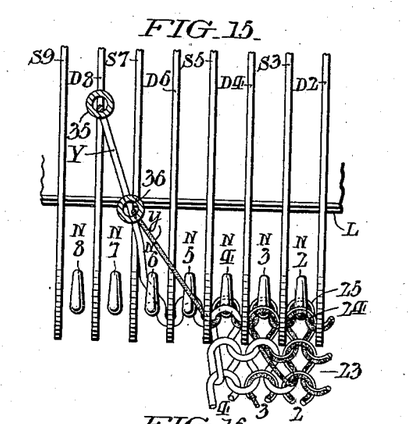

In Fig. 13, the yarns Y and y have been laid for the course 25 by leftward traverse of both said carriers 35 and 36, and the movement of both said carriers increased to the extent of two needles for the first step out in the widening from B to C in Fig. 1, said carriers having come to rest respectively over the divider D8 and the next inwardly adjacent sinker S7 in simulation of the condition in Fig. 6. Fig. 13 further shows the needles up, with the dividers and sinkers projected and said yarns measured and sunk. In Fig. 14, the sinkers and dividers are being retracted, and the needles going down and pressing against the ledge L. In Fig. 15, the needles are all the way down after having cast the loops of course 24 and after having drawn the loops of new course 25 below the sinkers and dividers which are in retracted position.

Figure 16:
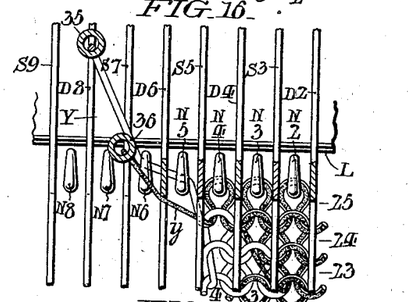
Figure 17:
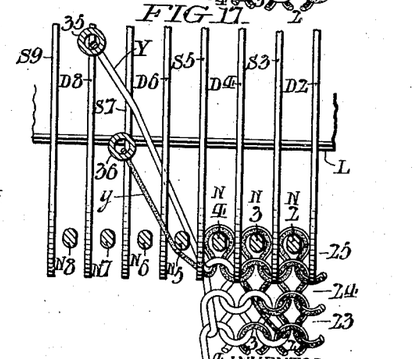
Figure 18:
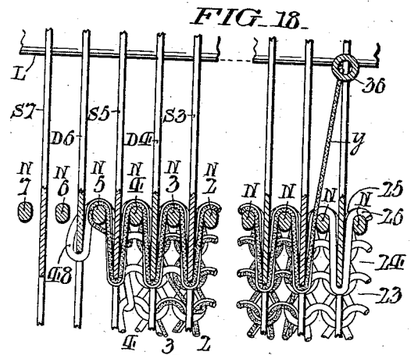
Figure 19:
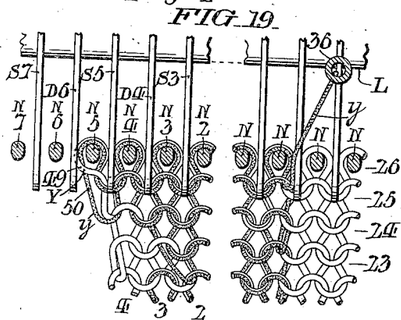

In Fig. 16, the sinkers and dividers have again been projected to hold down the fabric, while the needles are rising in proximity to the ledge L, the main yarn Y overlying the end of sinker S7 and the reinforcing yarn y overlying the end of divider D6 and said reinforcing yarn y being held forward of the needle N5 so that said needle may subsequently come up behind it. Fig. 17 shows the completion of the course 25, while in Fig. 13 the main yarn Y had been sunk around the shanks of needles N5 and N6 by the sinkers S5, S7 and divider D6, it will be seen from Fig. 16 that since there were no previously formed loops on said needles, the measured portions of the yarns beyond the needles N5 and N4 respectively were freed and absorbed as the needles receded from the position shown in Fig. 16 to the position shown in Fig. 17 in which latter the main yarn Y lies below and the reinforcing yarn y above the divider D6. As a consequence, during the next rightward traverse of the carriers 36 and 36 to lay the yarns for course 26 as in Fig. 18, the main yarn Y will be wrapped about the end of divider D6 and also about the shank of the needle N5 above the end of said divider D6, while the reinforcing yarn y will be wrapped only about the shank of said needle N5. In Fig. 18 the needles are up, and the sinkers and dividers projected with the loops of course 26 measured and sunk. Fig. 19 shows the completion of the course 26 with the loops of the latter below the ends of the sinkers and dividers, and with the needles up. As the needles descended from the position shown in Fig. 18 to form course 26, the needle N5 in its downward movement carried that portion of the bight 48 of the main yarn Y which was above the divider D6 with it, while that portion of said bight which was below said divider was cast over the top of said needle. This resulted in the formation of the twisted selvage loop 49 of the yarn Y, which loop was doubled on needle N5 with an untwisted selvage loop 50 of the reinforcing yarn y (see Fig. 2 also), the selvage loop 49 being locked by virtue of the passage of the main yarn Y through coincident sinker wale loops 51 and 52 of both yarns. Attention is directed to the fact that as a consequence of the release and absorption of the main yarn Y beyond the needle N5 as described in connection with Fig. 17, the fabric is widened to the extent of but a single loop during the first step out.

Figure 20:
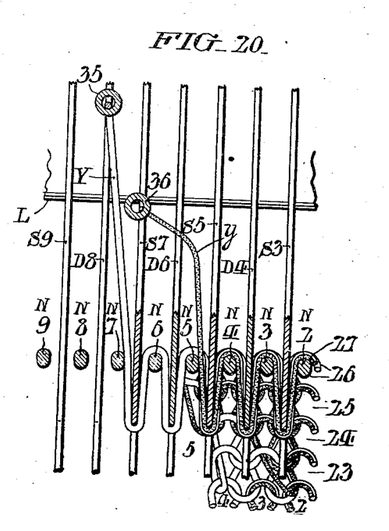
Figure 21:
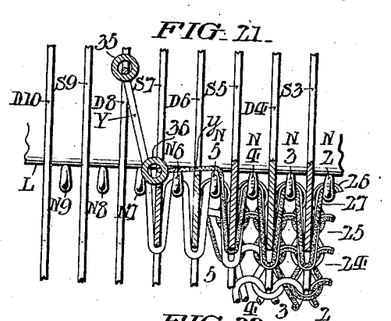
Figure 22:
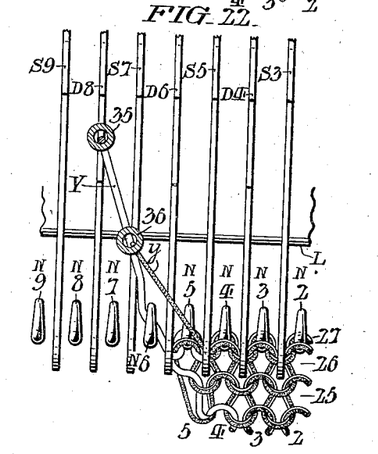
Figure 23:
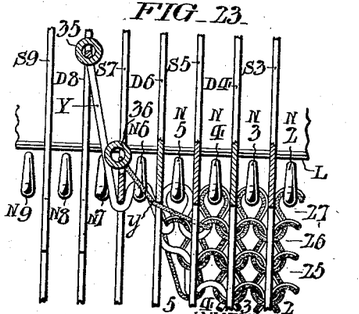
Figure 24:
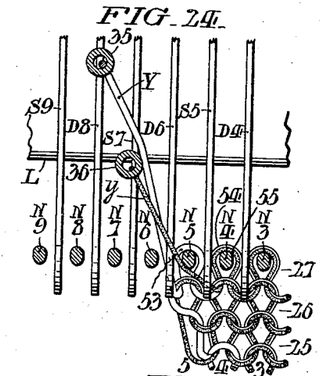
Figure 25:
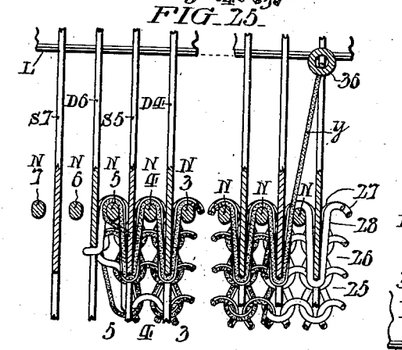

In Fig. 20, the carriers have been moved leftward without any further increase in the traverse to lay the yarns for the course 27, the needles being up with the sinkers and dividers fully projected and the loops for said course measured and sunk, and with the reinforcing yarn y again overlying the end of the divider D6. In Fig. 21, the needles are going down and pressing while the sinkers and dividers are receding. Fig. 22 shows the sinkers and dividers fully retracted, and the needles all the way down after having drawn the loops of the course 27 below the sinkers and dividers and through the loops of course 26, with the yarns Y and y lying respectively above the sinker S7 and the divider D6. Fig. 23 shows the sinkers and dividers projected and the needles rising with the needle N5 passing up behind the reinforcing yarn y. In Fig. 24 the parts are shown in the positions which they assume at the completion of course 27. In connection with course 27 it will be noted that a single loop 53 is formed on the end needle N5, whereas a loop 54 of said yarn is doubled on the now penultimate needle N4 with a loop 55 of the reinforcing yarn.

Figure 26:
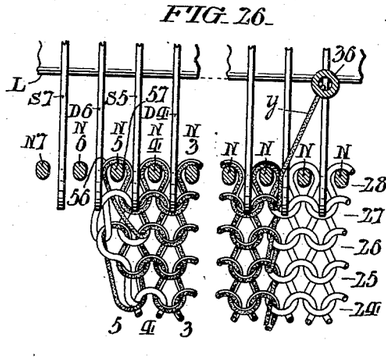
Figure 27:
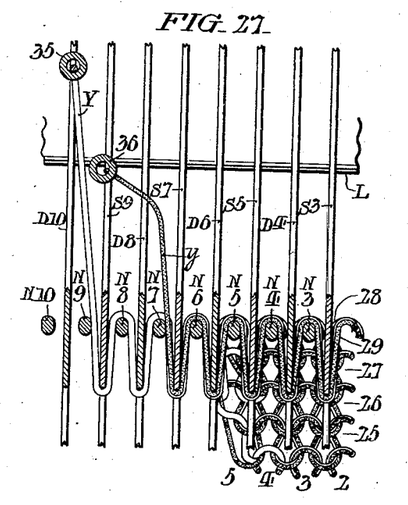

In Fig. 25 the carriers have again been moved to the right to lay the main and reinforcing yarns for the course 28, with the needles up, the sinkers and dividers projected, and the loops of said course measured and sunk, both yarns having been wrapped about the needle N5, the main yarn by virtue of having been caught and temporarily held by the end of divider D6. Fig. 26 shows the course 28 completed with its loops drawn through those of course 27, and with the sinkers and dividers projected and the needles up. In course 28 it will be noted that loop 56 of the main thread is doubled on needle N5 with a loop 57 of the reinforcing thread.

Figure 28:
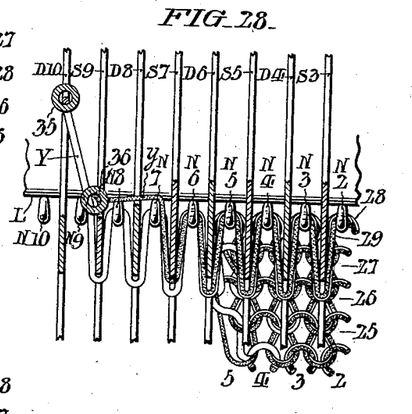
Figure 29:
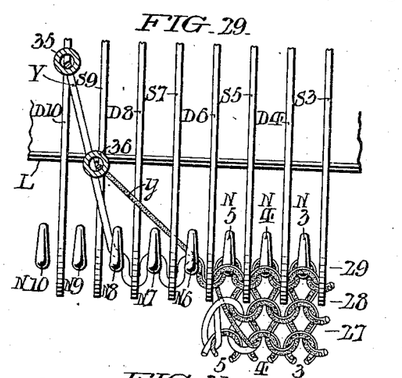
Figure 30:
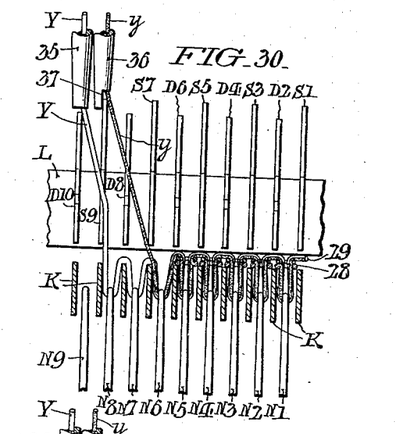
Figure 31:
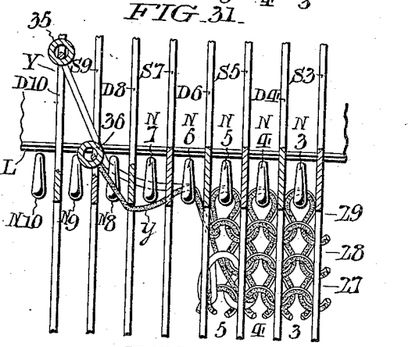
Figure 32:
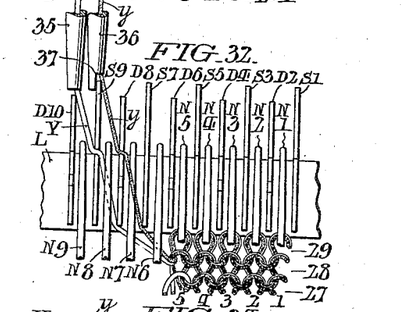
Figure 33:
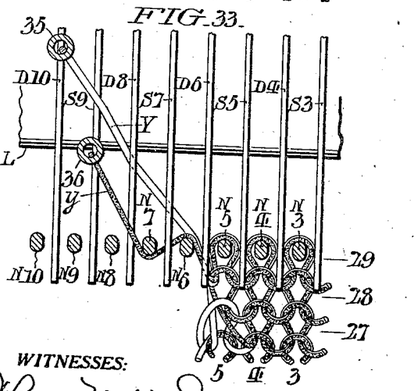
Figure 34:
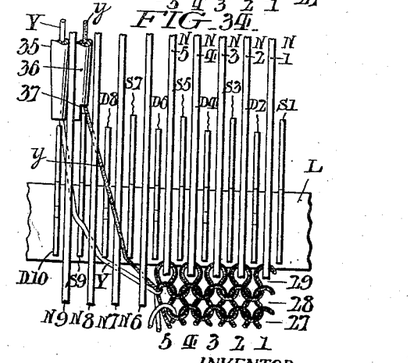

In Fig. 27 the carriers have again been moved to the left with an additional increase in the throw by a distance of two more needles for the second step out of the widening to lay the yarns for course 29, the needles being up, with the sinkers and dividers projected to measure and sink said yarns, and the yarn y overlying the divider D8 immediately to the right of the sinker S9 over which the carrier 36 is now stopped. Fig. 28 shows the sinkers and dividers receding and the needles going down into press against the ledge L. In Figs. 29 and 30 the sinkers and dividers have fully receded and the needles are down after having drawn the loops of course 29 below the sinkers and dividers and through the loops of course 28, with the main yarn Y overlying the end of the sinker S9 but underlying the sinker S7 and the intermediate divider D8, and the reinforcing yarn lying below the sinker S7 and over the end of said intermediate divider D8. Figs. 31 and 32 show the sinkers and dividers projected to hold down the course 29 while the needles are about to rise, the reinforcing yarn y having been displaced forwardly by the action of divider D8 so that the needle N7 may pass up behind it. Figs. 33 and 34 show the completion of the course 29 with the needles up and the sinkers and dividers retracted.

Figure 35:
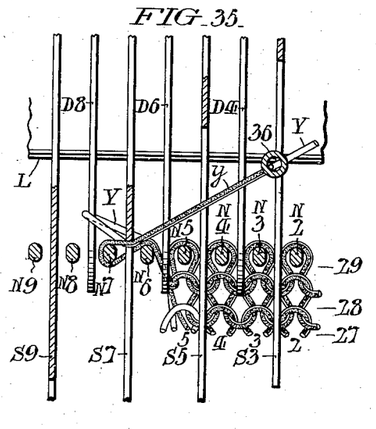
Figure 36:
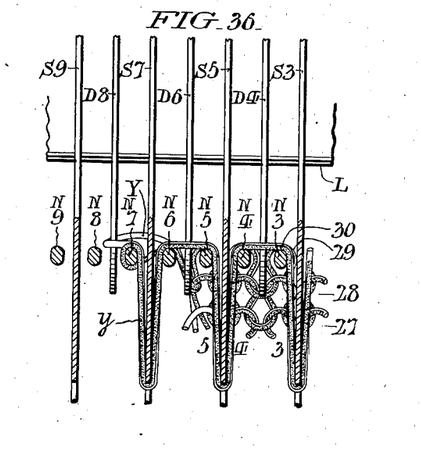
Figure 37:
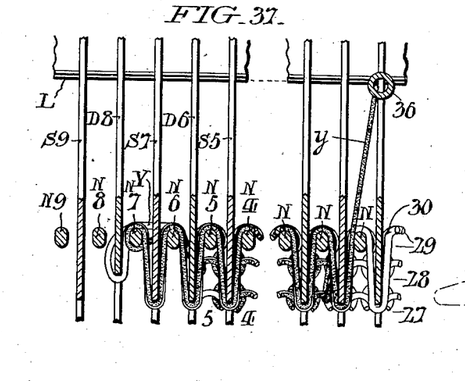
Figure 38:
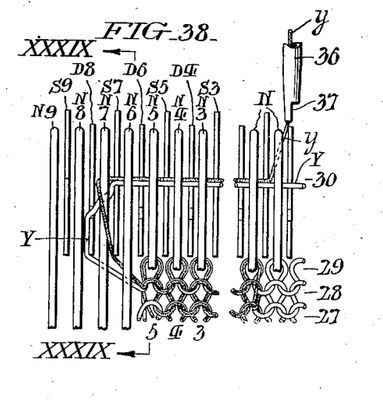
Figure 39:
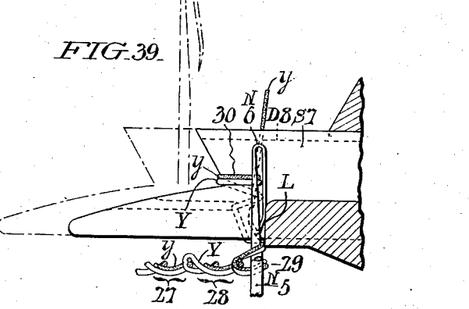
Figure 40:
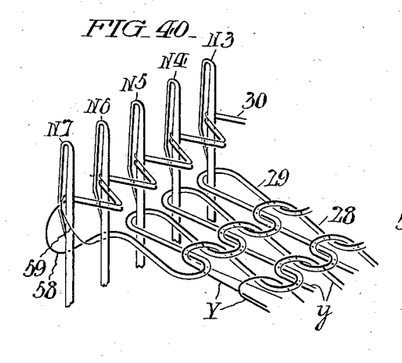
Figure 41:
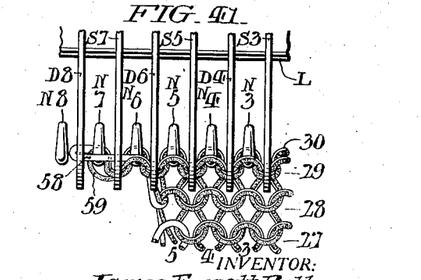
Figure 42:
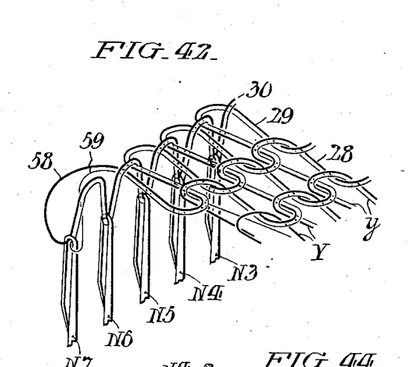
Figure 43:
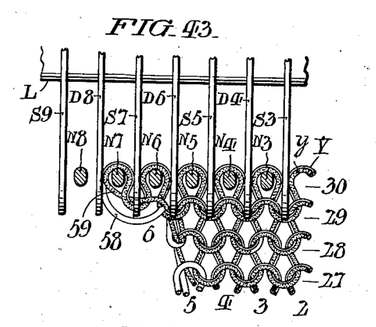
Figure 44:
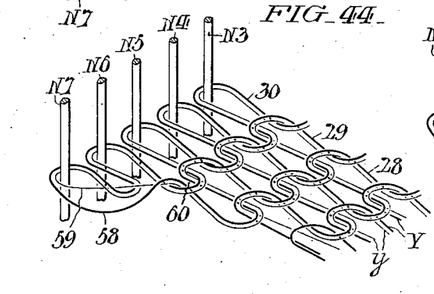

In Fig. 35 the carriers have started on their next rightward movement, the main yarn Y being caught and temporarily held by the divider D8 and the reinforcing yarn y being wrapped about the new end needle N7. Also in Fig. 35 the needles are up and the sinkers are being slurred and projected, but the dividers are still retracted. Fig. 36 shows a somewhat further advanced step in the current knitting cycle in which both yarns have been sunk by the sinkers but with the dividers still retracted. Fig. 37 is like Fig. 36 except for projection of the dividers. In Fig. 38 which is a front view of Fig. 37, and in Fig. 39 which is a cross section, the needles are going down in press with their beards closed by the ledge L in a still further advanced stage of the current knitting cycle, this action being more clearly shown in perspective in Fig. 40. From Figs. 38 and 39 it will be noted that the main thread Y at this time extends upward from the point of its anchorage in the fabric at needle N5 beneath the divider D6, sinker S7 and divider D8, then rightward through the lower notch of said divider and around the shank of the needle N7 at the beard side of the latter; while at the same time the reinforcing yarn y extends upward and leftward from the point of its anchorage in the fabric at the needle N5 beneath the divider D6, and sinker S7, then over the end of sinker S7, and then around the shank of needle N7 at the beard side of the latter. Fig. 41 shows the sinkers and the dividers retracted and the needles going down in the act of drawing the loops of course 30 from the ends of said sinkers and dividers, which action is further illustrated in perspective in Fig. 42. As the needles descend to complete course 30, the needles N6 and N7 draw the sunken bights of the main and reinforcing yarns down from the ends of the sinker S7 and divider D8 with attendant casting of the bight 58 of the main yarn Y as a loose loop over the tops of said needles 6 and 7 as shown in Figs. 41 and 42. At the same time a twisted selvage loop 59 of the reinforcing yarn is formed on the needle 7 likewise as shown in Figs. 41 and 42. Figs. 43 and 44 show the conclusion of the current knitting cycle with the course 30 completed, and the loops 58 and 59 in their final form, see Fig. 2 also. Here again it will be observed that the selvage is locked by virtue of the passage of one of the yarns—in this instance the reinforcing yarn y—through a divider wale loop 60 formed from both yarns. Attention is here directed to the fact that in accordance with my improved method of selvage formation, two extra end wale loops are added in the second step out as distinguished from the addition of but a single loop in the first step out.

Figure 2:
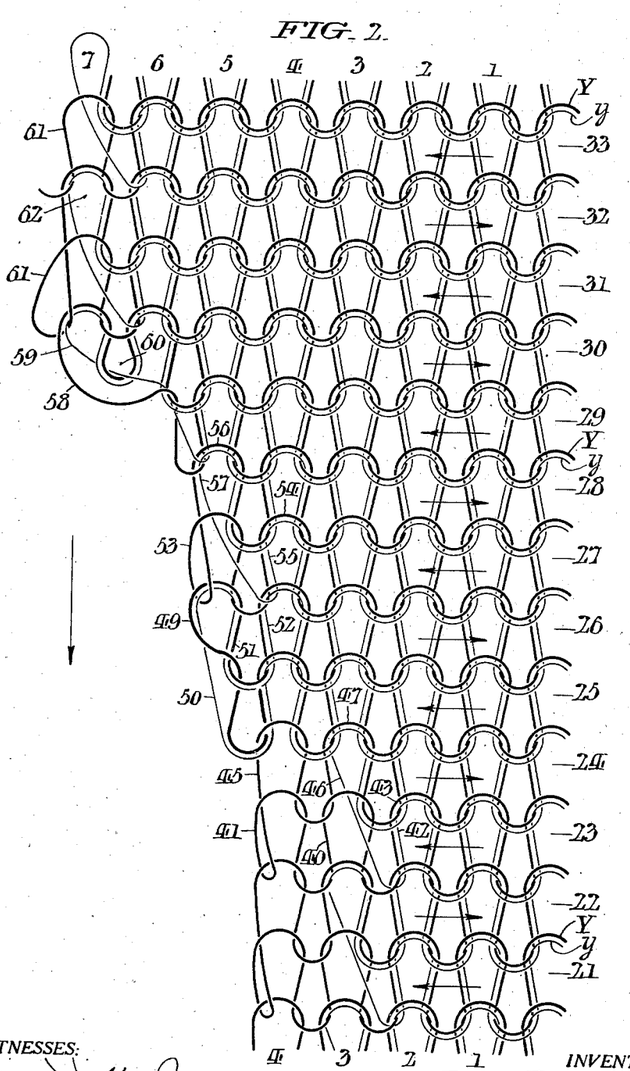
Fig. 2 is a fragmentary diagrammatic view showing the exact formation of the widened selvage at one of the heel cheeks within the area of the rectangle II in Fig. 1, the illustrated fabric being produced with use of but a single main yarn.
Figure 45:
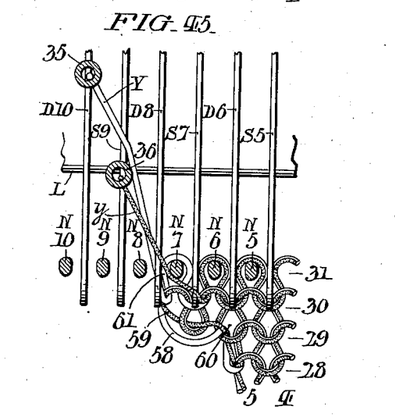
Figure 46:
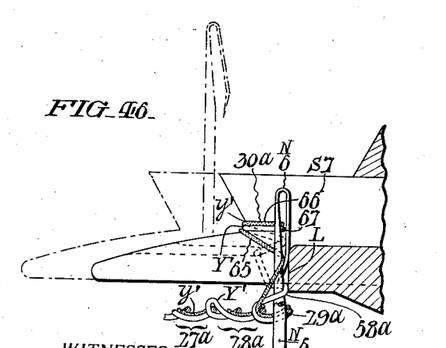
Figs. 46–52 are views similar to some of the preceding illustrations showing certain successive steps in the formation of the selvage illustrated in Fig. 3.

Fig. 45 shows the completion of the next course 31 of the knitting which was effected after leftward traverse of the yarn carriers 35 and 36 without further increase in such traverse. In this last knitting cycle it will be noted that a loop 61 was formed alone from the main yarn Y on the needle N7, the carriers 35 and 36 having come to rest respectively over sinker S9 and divider D10 with both yarns positioned in readiness to be wrapped about said needle in the succeeding traverse of said carriers to the right to form course 32. As a consequence of such positioning of the two yarns, a loop 62 is formed from both of them on needle N7 in the course 32, as shown in Fig. 2. With continued knitting of unwidened courses thereafter, end loops 61 from the main yarn alone will be found in alternate courses, and end loops 62 from both yarns in intermediate courses also as shown in Fig. 2.

All succeeding widening step outs will be exactly like the one last described, i. e., characterized by the addition of two extra end loops each time with the same form of interlocking of such loops at the selvage.

The foregoing description has been confined to widening at one side edge of the fabric, but it will be readily understood that an identical locked selvage is concurrently produced in exactly the same way along the other edge of the fabric.

Figure 3:
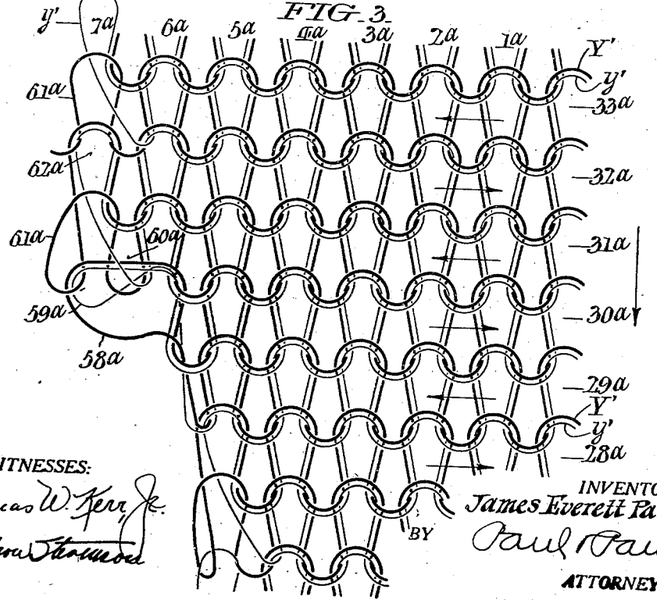
Fig. 3 is a view like Fig. 2 showing a slight variation of the widened selvage, the fabric also being produced with use of but a single main yarn.
Figure 47:
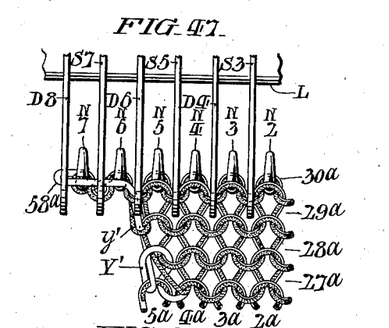
Figure 48:
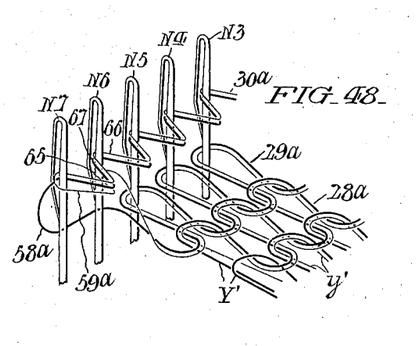
Figure 49:
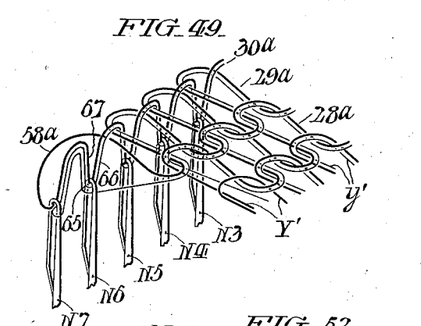
Figure 50:
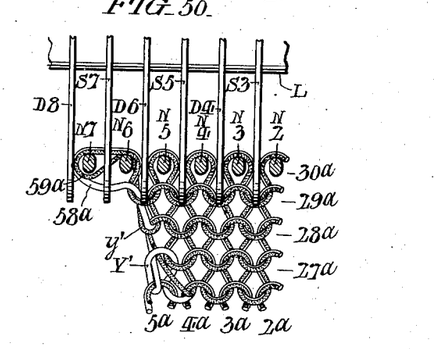
Figure 51:
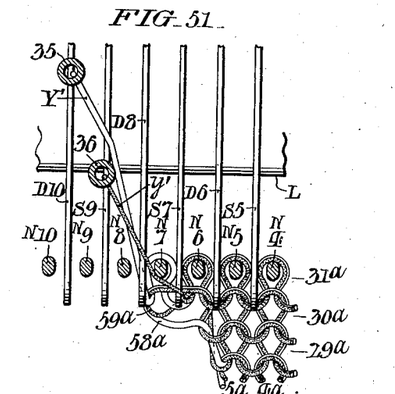
Figure 52:
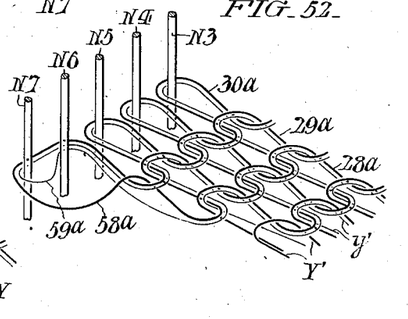

Differences in the tension of the reinforcing yarn may occasionally result in the slightly modified selvage formation shown in Fig. 3 in the second widening out at course 30a (which corresponds to the course 30 in Fig. 2), the incidental steps which result in such variation being shown in Figs. 46-52 (which are generally like Figs. 37-44). In this case, the reinforcing yarn y' (Fig. 46) instead of having remained below the sinker S7 (as in Fig. 39) en route to the carriage 36, a bight 65 thereof now passes over the end of said sinker, and, as shown, is caught with another bight 66 of said yarn and with a bight 67 of the main yarn Y' in the notch of said sinker. As the needle N6 descends during the formation of course 30a as shown in Figs. 47-49, the three yarn bights 65, 66 and 67 are caught beneath the hook of said needle and drawn down concurrently with the remaining loops of course 30a. This action is attended by rolling of the bight 58a of the main yarn Y' over the tops of needles N6 and N7 in a manner similar to that described in connection with Figs. 41-44, but in this instance, however, with attendant formation of an untwisted loop 59a of the reinforcing yarn y' instead of a twisted loop as before. Notwithstanding this change, however, the selvage at this point is locked upon completion of the next course 31a as shown in Figs. 3 and 51 as a consequence of the passage of portions of the loops 58a, 59a through the sinker wale loop 60a.

Figure 53:
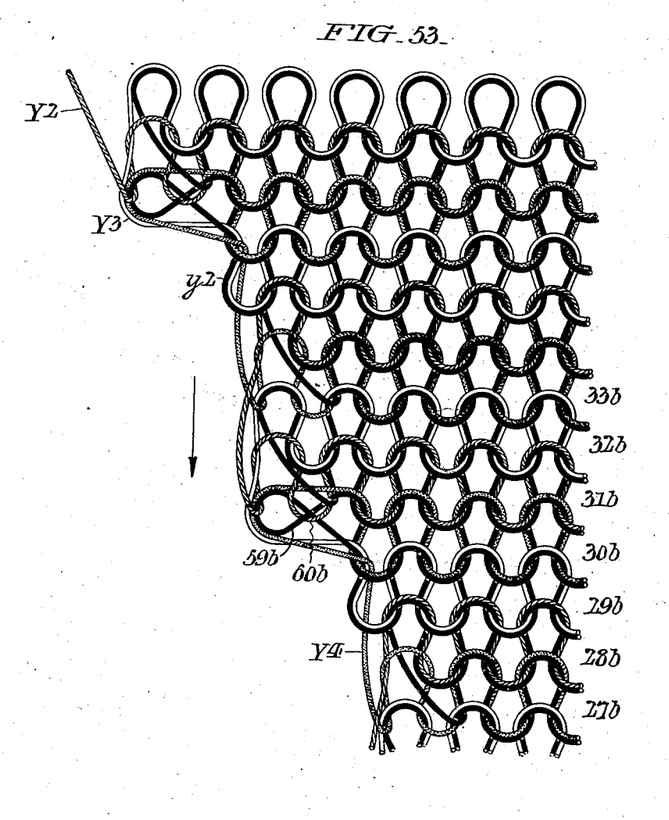
Fig. 53 is a diagrammatic view like Fig. 2, showing a widened ringless fabric embodying my invention.

The ringless fabric shown in Fig. 53 results from a procedure identical with that described in connection with Figs. 4-45, being, however, formed from three main yarns Y2, Y3 and Y4 alternately fed in a definite repeating sequence in conjunction with an extra yarn y2 for reinforcing the selvage, the yarns Y2, Y4 and y2 being variously shaded for convenience of distinction from each other and from the yarn Y3 which latter has been left clear. As shown, the selvage formation of this ringless fabric at the widened course 30b is similar to the selvage formation in the corresponding course 30 of Fig. 2, in that it involves a twisted end loop 59b of the reinforcing yarn y2 which is locked through passage of such thread through a sinker wale loop 60b. A slight variation will, however, be noted here in that the crossed portion of the twisted loop 59b is within the sinker wale loop 60b and that the latter constitutes a loop of the succeeding course 31b. Except for the longer skips of the main yarns at the selvages, the construction of the fabric in Fig. 53 is otherwise generally like that of Fig. 2.

Having thus described my invention, I claim:

1. The combination in a flat knitting machine having a row of needles, sinkers and dividers to cooperate with the needles in loop formation, and a traversing main yarn carrier adapted to come to rest at the end of each stroke above a divider with its delivery tube reaching to a level below the tops of the sinkers; and another carrier for a yarn for reinforcing an edge of the fabric produced on the machine, the latter carrier having its delivery tube reaching down to the same level as that of the tube of the first yarn carrier, but cut away at one side to a level above that of the sinkers for capacity to come to rest at the end of each outward stroke over the sinker immediately adjacent the divider over which the first yarn carrier tube comes to rest, and to deliver its yarn at a level above the delivery level of the first yarn.

2. The combination according to claim 1, in which the carrier tube for the reinforcing yarn is cut away at its inner side.

3. The method of producing knitted fabric with a reinforced selvage on a flat knitting machine having a row of needles, and sinkers and dividers to cooperate with the needles in loop formation, which method involves the delivery of a main yarn from a feed point traversing at a level below the tops of the sinkers; the delivery of an edge reinforcing yarn from a feed point traversing at a level above the tops of the sinkers; and terminating the traverse of the feed point of the reinforcing yarn above a sinker immediately inwardly adjacent the divider over which the feed point of the main yarn comes to rest at the end of its traverse.

4. The method of producing knitted fabric with a reinforced selvage on a flat knitting machine having a row of needles, and sinkers and dividers to cooperate with the needles in loop formation, which method involves the delivery of a main yarn from a feed point traversing at a level below the tops of the sinkers; the delivery of an edge reinforcing yarn from a feed point traversing at a level above the tops of the sinkers during outward movement of said point and causing the latter point to come to rest above the sinker immediately inwardly adjacent the divider over which the main yarn feed point rests at the completion of its traverse; and the delivery of the reinforcing yarn from a point traversing at the same level as the main yarn delivery point during inward laying of the splicing yarn.

5. The method of producing knitted fabric with a widened selvage by following the procedure set forth in claim 3, and occasionally increasing the traverse of the feed points of the main and reinforcing yarns without altering the stop relation of the feed points of said yarns at the completion of each widened course.

6. The method of producing knitted fabric with a widened selvage by following the procedure set forth in claim 4, and occasionally increasing the traverse of the feed points of the main and reinforcing yarns without altering the stop relation of the feed points of said yarns at the completion of each widened course.

7. In a flat knitting machine, a bank of knitting needles, cooperating jack sinkers and dividing sinkers, main and reinforcing yarn feeders with variable traverse, the reinforcing yarn feeder having high and low yarn delivery exits adapted to feed the yarn from upper and lower levels respectively during traversing movements toward and from the selvage, while the main yarn feeder has yarn exits to deliver at such lower level in both directions.

8. In a knitting machine of the kind described, in combination with a series of needles, a plurality of yarn feeders traversible in rightward and leftward directions along the needle series, and between selvages, a first feeder having yarn delivery exits both at the same level for feed in both traversing directions, and a second feeder having its exits at different levels, with the exit operating during traverse toward a selvage so much higher than the other as to miss the end needle to which the first feeder supplies yarn.

9. A machine as in claim 8 and wherein the second yarn feeder comprises an upright yarn guide or tube with its lower end formed or recessed to present low and high edges at its outer and inner sides respectively, constituting yarn delivery exits for inward and outward traverse respectively.

JAMES EVERETT PATTON.